USOO9439352B2

(12) United States Patent
Arvidsson

(10) Patent No.: US 9,439,352 B2
(45) Date of Patent: Sep. 13, 2016

(54) HANDLE HEIGHT ADJUSTER FOR WALK BEHIND MOWER

(71) Applicant: Husqvarna AB, Huskvarna (SE)

(72) Inventor: Mikael Arvidsson, Jönköping (SE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 14/611,759

(22) Filed: Feb. 2, 2015

(65) Prior Publication Data
US 2016/0219784 A1    Aug. 4, 2016

(51) Int. Cl.
*A01D 34/82* (2006.01)
*A01D 34/68* (2006.01)

(52) U.S. Cl.
CPC ............. *A01D 34/824* (2013.01); *A01D 34/68* (2013.01)

(58) Field of Classification Search
CPC ...... A01D 34/82; A01D 34/46; A01D 34/67; A01D 34/824; B62B 5/064; B62B 5/066; B62B 5/067
USPC ........................ 16/437; 56/16.7, 320.1, 14.7; 280/47.371, 651
See application file for complete search history.

(56) References Cited

U.S. PATENT DOCUMENTS

| | | | |
|---|---|---|---|
| 1,957,991 A * | 5/1934 | Bloodworth | A01B 3/08 172/366 |
| 2,727,753 A | 12/1955 | Johnson | |
| 3,421,776 A | 1/1969 | McCoy et al. | |
| 3,527,469 A | 9/1970 | Gobin | |
| 3,764,156 A | 10/1973 | Nepper et al. | |
| 3,791,116 A | 2/1974 | Wykhuis | |
| 4,006,580 A | 2/1977 | Kalleicher | |
| 4,017,922 A * | 4/1977 | Tischler | A47C 23/16 267/87 |
| 5,230,208 A | 7/1993 | Hess et al. | |
| 5,526,633 A | 6/1996 | Strong et al. | |
| 5,749,209 A | 5/1998 | Thomason | |
| 5,842,329 A * | 12/1998 | Carter | A01D 34/824 16/437 |
| 6,041,584 A | 3/2000 | Hohnl | |

(Continued)

FOREIGN PATENT DOCUMENTS

| | | |
|---|---|---|
| AU | 422530 B2 | 3/1972 |
| CA | 2735595 C | 12/2013 |

(Continued)

OTHER PUBLICATIONS

Grizzly "Grizzly ERM 1638 G High Wheeler Electric Lawn Mower", http://www.grizzlybaltic.com/en/lawn-mowers-30/electric-lawn-mower-grizzly-erm-1638-g--ek9-highwheeler-119, v-solutions.lt.

*Primary Examiner* — John G Weiss
(74) *Attorney, Agent, or Firm* — Nelson Mullins Riley & Scarborough LLP

(57) ABSTRACT

A lawn mower may include a blade housing configured to house at least one blade, an engine supported at least in part by the blade housing to selectively rotate the at least one blade, a handle assembly comprising at least one handle member for guiding operation of the lawn mower by an operator walking substantially behind the lawn mower, and a handle height adjustment assembly. The handle height adjustment assembly enables the handle member to be fixed in at least a first operating position or a second operating position each of which defines different handle heights for the handle member responsive to the handle height adjustment assembly being in a locked state, and enables the handle member to be rotated between the first operating position, the second operating position, and a folded position responsive to the handle height adjustment assembly being in an unlocked state.

15 Claims, 5 Drawing Sheets

(56) References Cited

U.S. PATENT DOCUMENTS

| | | |
|---|---|---|
| 7,624,998 B2 | 12/2009 | Barlow et al. |
| 8,166,737 B2 | 5/2012 | Ninomiya et al. |
| 8,297,032 B2 | 10/2012 | Ninomiya et al. |
| 8,347,593 B2 | 1/2013 | Ito et al. |
| 8,713,761 B2 | 5/2014 | Grewe et al. |
| 2006/0053762 A1* | 3/2006 | Stover .................. A01D 34/824 56/16.7 |
| 2007/0039304 A1 | 2/2007 | Wright et al. |
| 2011/0239611 A1 | 10/2011 | Maruyama et al. |
| 2013/0046448 A1 | 2/2013 | Fan et al. |
| 2013/0220067 A1 | 8/2013 | Grewe et al. |
| 2014/0260157 A1* | 9/2014 | Baker .................. A01D 34/824 56/16.6 |

FOREIGN PATENT DOCUMENTS

| | | | |
|---|---|---|---|
| CN | 203407205 U | | 1/2014 |
| DE | 19741679 | * | 4/1999 |
| DE | 202013005119 U1 | | 6/2013 |
| EP | 0047502 B1 | | 2/1985 |
| EP | 1169900 A1 | | 1/2002 |
| EP | 1752036 B1 | | 7/2008 |
| EP | 1763986 B1 | | 3/2009 |
| EP | 1997365 B1 | | 11/2010 |
| EP | 1637023 B1 | | 6/2011 |
| EP | 2476303 A1 | | 7/2012 |
| EP | 2371200 B1 | | 9/2012 |
| EP | 2298060 B1 | | 7/2013 |
| FR | 2893481 A1 | | 5/2007 |
| FR | 2928210 B3 | | 3/2010 |
| GB | 2328359 A | | 2/1999 |
| GB | 2481107 A | | 12/2011 |
| JP | 3664051 | * | 6/2005 |
| JP | 2013074810 A | | 4/2013 |
| KR | 1247806 B1 | | 3/2013 |

* cited by examiner

HANDLE HEIGHT ADJUSTER FOR WALK BEHIND MOWER

TECHNICAL FIELD

Example embodiments generally relate to outdoor power equipment and, more particularly, relate to a walk behind lawn mower with an adjustable handle.

BACKGROUND

Yard maintenance tasks are commonly performed using various tools and/or machines that are configured for the performance of corresponding specific tasks. Certain tasks, like grass cutting, are typically performed by lawn mowers. Lawn mowers themselves may have many different configurations to support the needs and budgets of consumers. Walk-behind lawn mowers are typically relatively compact, have comparatively small engines and are relatively inexpensive. Meanwhile, at the other end of the spectrum, riding lawn mowers, such as lawn tractors, can be quite large. Riding lawn mowers can sometimes also be configured with various functional accessories (e.g., trailers, tillers and/or the like) in addition to grass cutting components. Riding lawn mowers can also be ruggedly built and have sufficient power, traction, and handling capabilities to enable operators to mow over rough terrain, if needed.

Walk behind models are often used when smaller lots or tighter areas are to be mowed. Some, relatively simple walk behind models may move responsive only to the pushing force provided by the operator. However, other models may provide power to the wheels to assist the operator relative to providing mobility for the lawn mower. In either case, the operator typically controls the lawn mower and/or pushes the lawn mower via a handle assembly that extends rearward and upward behind the lawn mower to allow the operator to engage the handle assembly while walking behind the lawn mower.

It has long been appreciated that handle height adjustment can greatly improve the operator's comfort and therefore also enhance the operator experience while mowing. Accordingly, a great many solutions for providing handle height adjustment have been developed through the years. However, as improved materials and technologies become available, it should be expected that yet further advancements will come forward in this area.

BRIEF SUMMARY OF SOME EXAMPLES

Some example embodiments may therefore provide for improved lawn mower design by providing a handle height adjuster that provides the ability to not only set different handle heights, but also easily and intuitively fold the handle for improved storage capabilities. Some example embodiments may provide for improving the operator experience relative to the ease of use and convenience associated with storage of the lawn mower and overall operability of the lawn mower.

In an example embodiment, a lawn mower may be provided. The lawn mower may include a blade housing configured to house at least one blade, an engine supported at least in part by the blade housing to selectively rotate the at least one blade, a handle assembly comprising at least one handle member for guiding operation of the lawn mower by an operator walking substantially behind the lawn mower, and a handle height adjustment assembly. The handle height adjustment assembly may enable the at least one handle member to be fixed in at least a first operating position or a second operating position each of which defines different handle heights for the at least one handle member responsive to the handle height adjustment assembly being in a locked state, and may also enable the at least one handle member to be rotated between the first operating position, the second operating position, and a folded position responsive to the handle height adjustment assembly being in an unlocked state.

In another example embodiment, handle height adjustment assembly may be provided. The handle height adjustment assembly may be for adjusting a height of at least one handle member of a walk-behind outdoor power equipment device and may include a knob assembly movable along (and in some cases rotatable about) a first axis to shift between a locked state and an unlocked state. The knob assembly may be movable linearly in a direction perpendicular to the first axis to alternately enable and prevent rotation of the at least one handle member about a second axis that extends substantially parallel to the first axis. The at least one handle member may rotate about the second axis to shift between a first operating position and a second operating position, and a folded position in the unlocked state.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
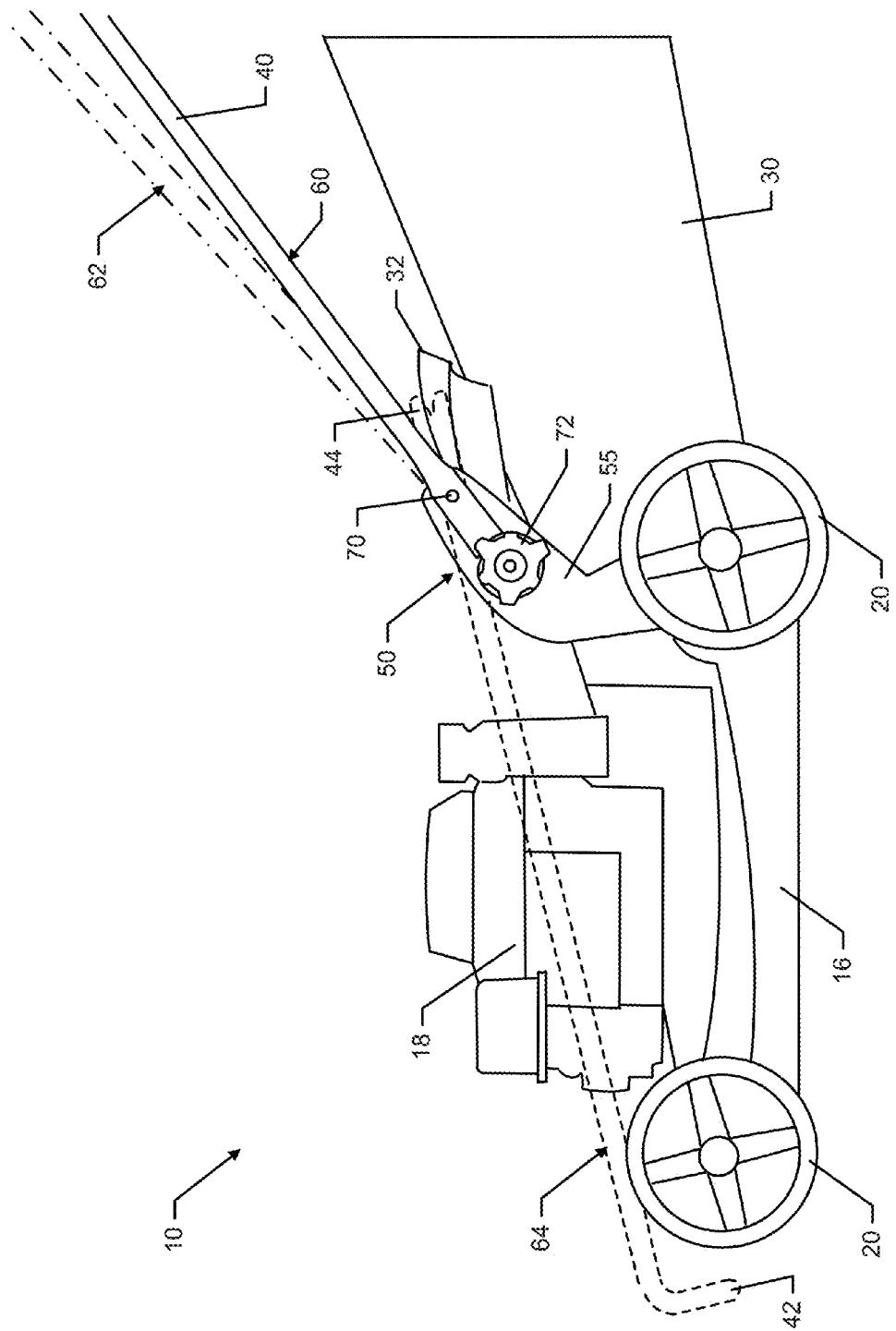
FIG. 1 illustrates a side view of a walk-behind lawn mower having a handle height adjustment assembly according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

FIG. 1 illustrates a side view of a walk-behind lawn mower 10 of an example embodiment. However, it should be appreciated that the walk-behind lawn mower 10 is just one example of an outdoor power equipment device on which an example embodiment may be practiced. In other examples, the outdoor power equipment device could be a trimmer, edger, tiller, snow thrower and/or the like. An operator may be located at an operator location behind the lawn mower 10. The lawn mower 10 of FIG. 1 includes a blade housing 16 that may house a rotatable cutting blade (not shown). The cutting blade may be suspended above the ground at the end of a rotatable shaft (e.g., a drive shaft—again not shown in FIG. 1) that may be turned responsive to operation of an engine 18, such as a gasoline powered engine or an electric motor. Operation of the engine 18 may be initiated by a recoil starter via pulling of a recoil starter handle by the operator. However, in other embodiments, the engine 18 may alternatively be started via a key, switch, electronic ignition or other similar device.

The lawn mower 10 may include a mobility assembly on which a substantial portion of the weight of the lawn mower 10 may rest when the lawn mower 10 is stationary. The mobility assembly may also provide for movement of the lawn mower 10. In some cases, the mobility assembly may be driven via power from the engine 18 that may be selectively provided to ground engaging wheels 20, which make up the mobility assembly.

In some examples, the ground engaging wheels 20 may be adjustable in their respective heights. Adjusting the height of the front wheels and/or the back wheels may be employed in order to provide a level cut and/or to adjust the height of the cutting blade. In some embodiments, a local wheel height adjuster may be provided at the front wheels and/or the back wheels. However, in other embodiments, remote wheel height adjustment may also or alternatively be possible.

Rotation of the cutting blade may generate grass clippings, and/or other debris that may be ejected from the blade housing 16. In some cases, the clippings/debris may be ejected from a side or rear of the blade housing 16. When a rear discharge is employed, many such lawn mowers may employ a collector 30 to collect discharged clippings/debris. However, collectors may also be used for side discharge models in some cases. The collector 30 may be removable to enable the operator to empty the collector 30, and the collector 30 may be made of fabric, plastic or other suitable materials. In an example embodiment, a rear door 32 may be provided to mate with the collector 30 when the lawn mower 10 is ready to cut grass with the collector 30 attached, and to close off the rear of the blade housing 16 for operation without the collector 30.

In an example embodiment, the lawn mower 10 may further include a handle assembly. The handle assembly of FIG. 1 may include two handle members 40 (only one of which is visible in the side view of FIG. 1) that extend generally rearward and upward from opposing sides of a rear portion of the blade housing 16. The handle members 40 may be substantially parallel to each other and may be connected to each other at their distal ends via a cross bar. The cross bar may be at a distal end 42 of the handle members 40. A proximal end 44 of the handle members 40 may engage or otherwise be operably coupled to the lawn mower 10 (e.g., to the blade housing 16). Thus, the terms distal and proximal should be understood to be used in reference to the blade housing 16 or engine 18 of the lawn mower 10.

The handle members 40 may be adjustable in height or may be foldable to reduce the amount of space that the lawn mower 10 consumes when stored or shipped via operation of a handle height adjustment assembly 50. In some embodiments, various controls may be provided proximate to the cross bar and/or one or more of the handle members 40. For example, a trigger controller (not shown) may be provided in some cases. Additionally or alternatively, an operator bail may be provided. When the operator bail is held proximate to the cross bar, power from the engine may be delivered to the cutting blade. In some cases, when the operator bail is held proximate to the cross bar, power may be enabled to be delivered to either or both of the ground engaging wheels 20 via a drive system of the lawn mower 10.

As shown in FIG. 1, the handle height adjustment assembly 50 may be provided at a handle bracket 55 that may extend substantially upwardly and rearwardly from a rear portion of the blade housing 16 (e.g., proximate to the rear wheels). One handle bracket 55 may be provided proximate to each rear wheel to correspond to each respective one of the handle members 40. Furthermore, the handle brackets 55 may be on opposing sides of the rear door 32 and the rear discharge opening. Because the handle brackets 55 are provided outside of the rear door 32, the bagging attachment 30 may be secured without regard to the position of the handle members 40, and the handle members 40 can even be moved between operating positions or folded without necessarily impacting the bagging attachment.

In an example embodiment, the blade housing 16 and the handle bracket 55 may be made of substantially the same or similar materials. For example, the blade housing 16 and the handle bracket 55 could each be made of steel, composite materials, or other sufficiently rigid and strong materials. The blade housing 16 and/or other portions of the lawn mower 10 that form a framework or structural platform upon which the components of the lawn mower 10 are assembled may be stamped, molded, welded, secured or otherwise assembled together to define a rugged and durable structure.

The handle height adjustment assembly 50 may be operable to allow the operator to select one of at least two different operating positions of the handle members 40. Each different operating position may correspond to a different handle height for the handle members 40. The handle members 40 are shown in solid lines in FIG. 1 in a first operating position 60 among the at least two different selectable operating positions (e.g., at a lower handle height). However, a set of dashed lines is also shown to outline another available operating position, and a second set of dashed lines shows a non-operating, folded position. In this regard, a second operating position 62 is shown with a higher handle height and a folded position 64 is shown where the handle is folded fully forward for storage or shipping. It should be appreciated that additional positions could also be defined in some alternative example embodiments.

In each of the possible handle positions, the handle height adjustment assembly 50 may be operated to shift between an unlocked state, which allows the handle members 40 to be rotated about a pivot point 70, and a locked state, which holds the handle members 40 in a corresponding desired position. In some embodiments, the handle height adjustment assembly 50 may be designed so that the first operating position 60 and the second operating position 62 can only be maintained when the handle height adjustment assembly 50 is in the locked state. However, in order to shift between the first operating position 60 and the second operating position 62, the handle height adjustment assembly 50 must be in the unlocked state. Additionally, to shift from either of the first operating position 60 or the second operating position 62 to the folded position 64, the handle height adjustment assembly 50 must be in the unlocked state. Moreover, in some cases, the handle height adjustment assembly 50 may be biased (e.g., with gravity or spring force) toward the unlocked state so that when transitioning from the folded position 64, there is less potential to damage the handle height adjustment assembly 50 by rotation of the handle members 40 quickly toward either of the operating positions.

Figure 2:
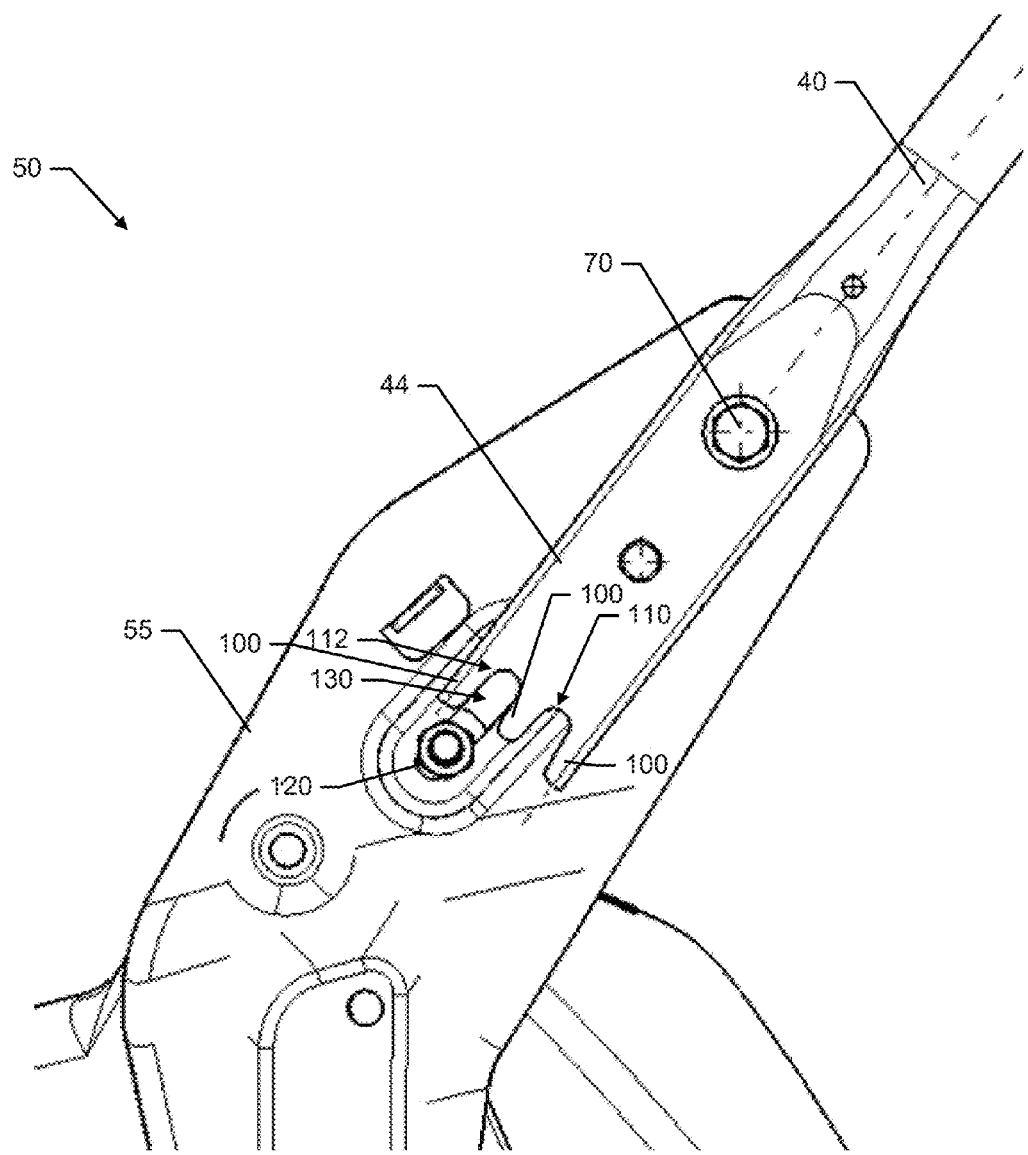
FIG. 2 illustrates a side view of the handle height adjustment assembly in a disengaged position according to an example embodiment.
Figure 3:
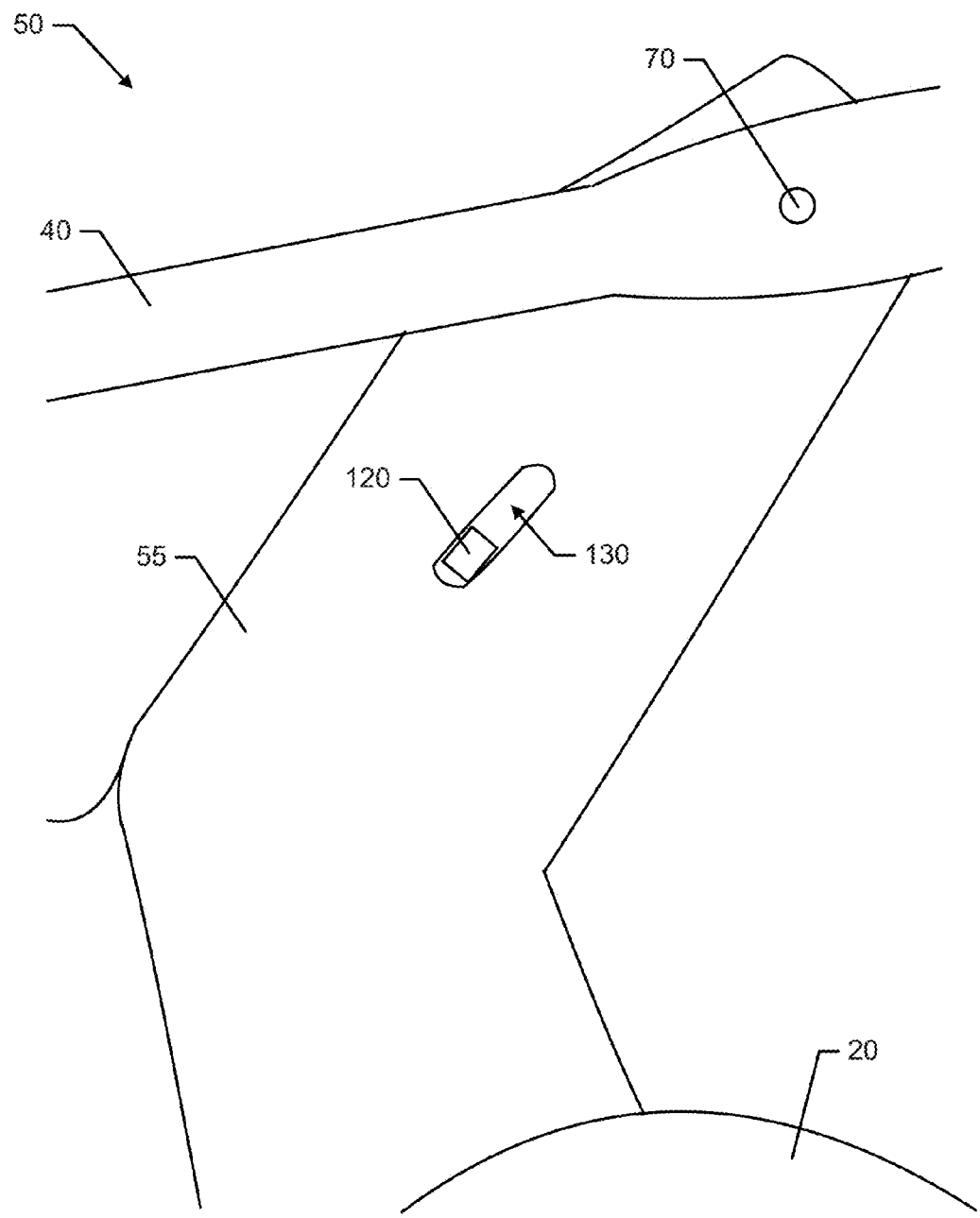
FIG. 3 illustrates a handle assembly folded over to a storage position responsive to operation of the handle height adjustment assembly in accordance with an example embodiment.
Figure 5:
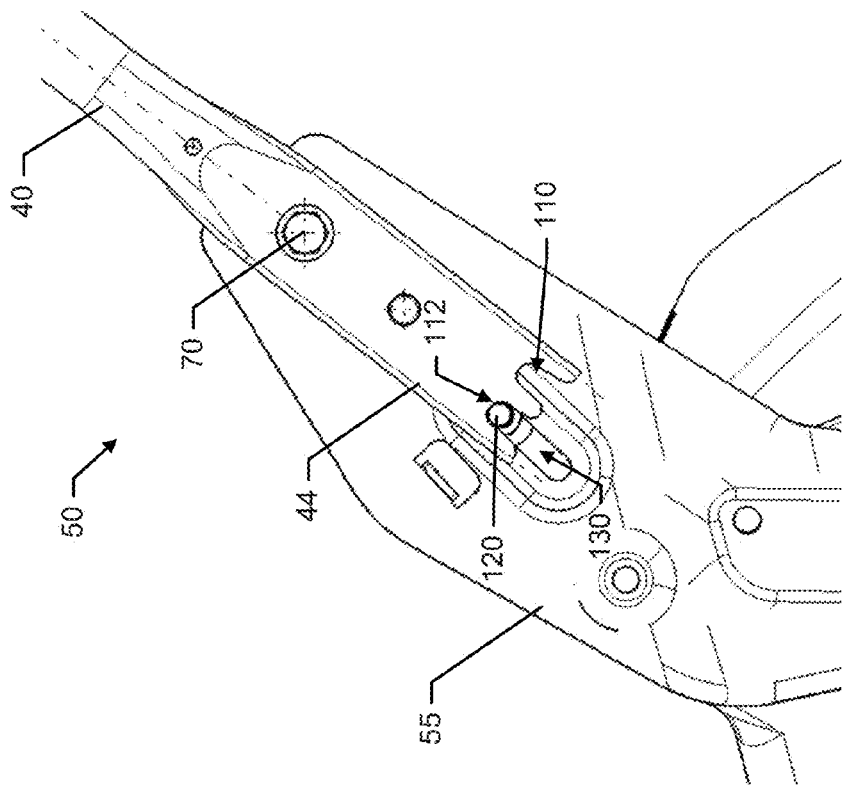
FIG. 5 illustrates a side view of the handle height adjustment assembly in a second operable position according to an example embodiment.
Figure 4:
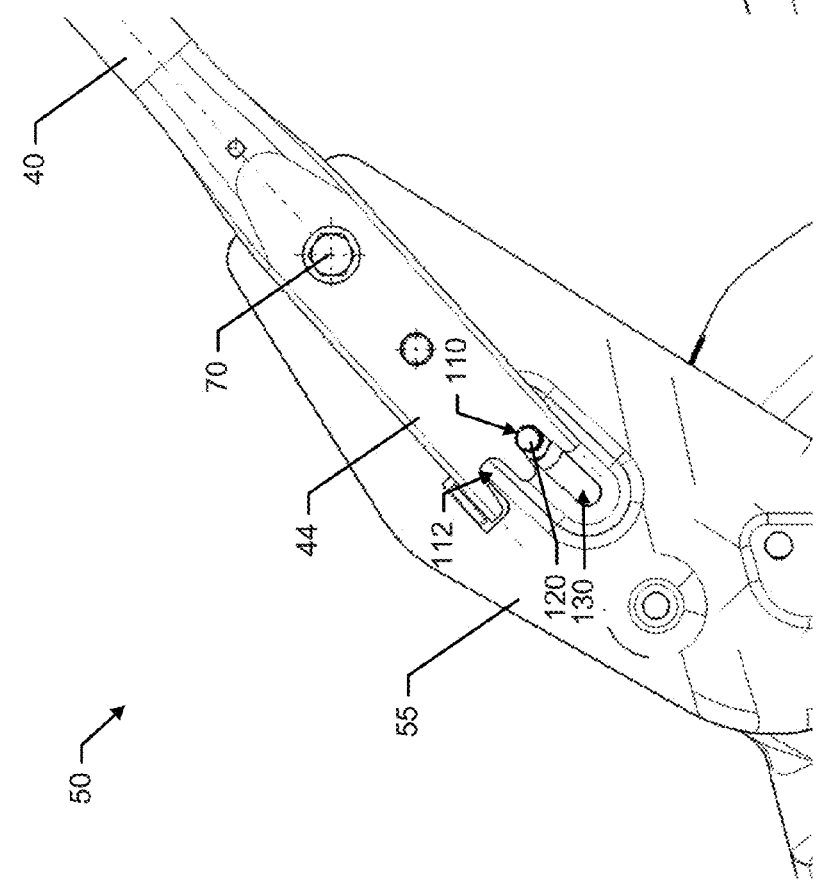
FIG. 4 illustrates a side view of the handle height adjustment assembly in a first operable position according to an example embodiment.
Figure 6:
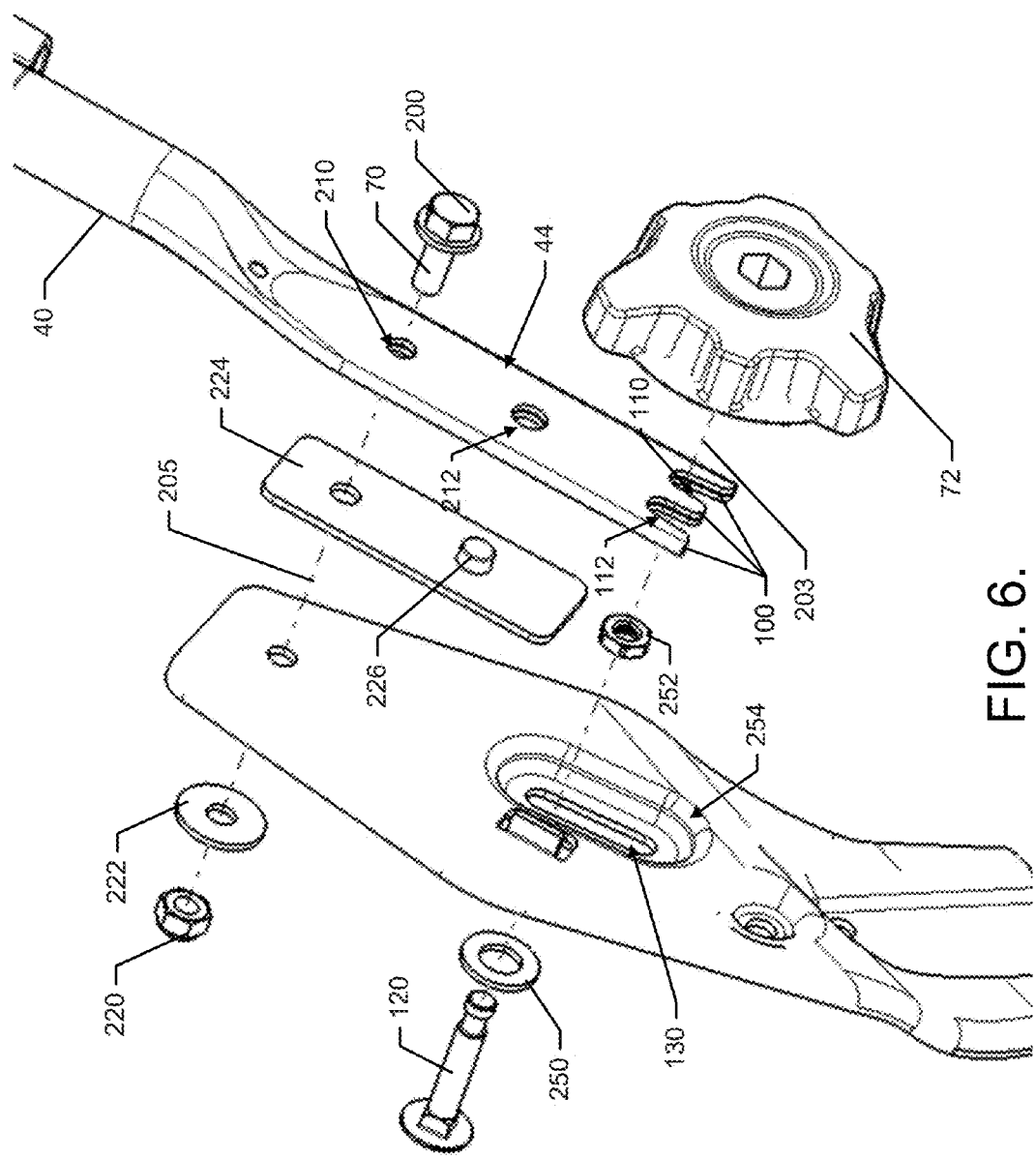
FIG. 6 illustrates an exploded perspective view of the handle height adjustment assembly according to an example embodiment.

FIG. 2 shows the handle height adjustment assembly 50 in the unlocked state with the handle members 40 being otherwise in the first operating position 60. FIG. 3 illustrates the handle members 40 rotated forward to the folded position 64 from the situation shown in FIG. 2. FIGS. 4 and 5 show the handle height adjustment assembly 50 in the locked state in the first operating position 60 and second operating position 62, respectively. FIG. 6 illustrates an exploded view of the components of the handle height adjustment assembly 50. Further discussion of the construction and operation of the handle height adjustment assembly 50 will be provided below in reference to FIGS. 1-6.

As can be appreciated from FIG. 1, a knob 72 of the handle height adjustment assembly 50 is operable to transition the handle height adjustment assembly 50 between the locked and unlocked states. Moreover, the knob 72 is configured to selectively engage the proximal end 44 of the handle members 40 to shift to the locked state, and to disengage the proximal end 44 of the handle members 40 to shift to the unlocked state. In an example embodiment, the knob 72 may be movable along (e.g., rotatable about) an axis that is spaced apart from, but otherwise substantially parallel to an axis of rotation of the handle members 40 that is defined by the pivot point 70. Rotation of the knob 72 in one direction (e.g., clockwise) may tighten the knob 72 onto or toward the handle bracket 55, and the knob 72 may become substantially fixed relative to the handle bracket 55 when a sufficient amount of force is applied by tightening of the knob 72 to prevent relative movement between the knob 72 and the handle bracket 55. As such, for example, the knob 72 serves to clamp the proximal end 44 of the handle member 40 (e.g., between the knob 72 and the handle bracket 55). In some embodiments, when the knob 72 is both tightened and engaged with the proximal end 44 of its corresponding handle member 40, the handle height adjustment assembly 50 may be in the locked state. Meanwhile, rotation of the knob 72 in the other direction (e.g., counterclockwise) may loosen the knob 72 or move the knob 72 away from the handle bracket 55. In some embodiments, when the knob 72 is loosened and disengaged from the proximal end 44 of its corresponding handle member 40, the handle height adjustment assembly 50 may be in the unlocked state.

Accordingly, shifting of the knob 72 between the locked state and the unlocked state may alternately involve engaging and disengaging the proximal end 44 of the handle members 40 to alternately prevent and allow rotation around the pivot point 70. However, in an example embodiment, shifting of the knob 72 between the locked state and the unlocked state may not merely involve tightening or loosening the coupling between the knob 72 and the handle bracket 55, but may also involve a movement of the knob 72 linearly in alternate directions toward and away from the proximal end 44 of the handle members 40 (e.g., along the length of locking slot 130). Movement of the knob 72 toward the proximal end 44 of the handle members 40 (to engage the same) combined with tightening the knob 74 may pinch (e.g., clamp) the proximal end 44 between the knob 74 and the handle bracket 55 to effectuate the locked state. Movement of the knob 72 away from the proximal end 44 of the handle members 40 (to disengage the same) after loosening the knob 74 may release the proximal end 44 from the knob 74 to rotate between the knob 74 and the handle bracket 55 to effectuate the unlocked state.

In some embodiments, the locked state may be further reinforced beyond just a pinching force holding the handle members 40 in the locked state. In this regard, for example, the proximal end 44 may be provided with at least two engagement slots formed between protrusions 100 that are formed at the proximal end 44 as shown in FIG. 2. The engagement slots may include a first engagement slot 110 and a second engagement slot 112, but additional engagement slots could be provided in some embodiments. The first and second engagement slots 110 and 112 may be formed to extend substantially parallel to each other and to the direction of longitudinal extension of the handle members 40. The first and second engagement slots 110 and 112 may also extend substantially parallel to the direction of extension of the protrusions 100. At least one of the protrusions 100 may be formed on each side of each of the engagement slots. Thus, at least one of the protrusions 100 may also be formed between the first and second engagement slots 110 and 112.

In an example embodiment, the knob 72 may be affixed to a fastening element 120 such as a post or screw. In some cases, the post or screw may have threads disposed on an external periphery thereof, and the knob 72 may have corresponding threads formed on an internal periphery of a receiving opening in the knob 72. Mutual engagement of these threads while turning the knob 72 in the tightening and loosening directions may allow the knob 72 to alternately be tightened and loosened relative to the handle bracket 55 and, when loosened, the fastening element 120 may be enabled to freely move within a locking slot 130 formed in the handle bracket 55.

The locking slot 130 may be formed such that the first and second engagement slots 110 and 112 are each alternately capable of being aligned with the locking slot 130 responsive to rotation of the handle members 40 about the pivot point 70. Moreover, when the first engagement slot 110 is aligned with the locking slot 130, the handle members 40 may be substantially in the first operating position 60. When the second engagement slot 112 is aligned with the locking slot 130, the handle members may be substantially in the second operating position 62.

The locking slot 130 may have a width in a transverse direction that is slightly larger than a width of the fastening element 120. The locking slot 130 may have a length in a longitudinal direction that is large enough to allow the fastening element 120 to be completely withdrawn from the first engagement slot 110 (or the second engagement slot 112) or completely inserted within the first engagement slot 110 (or the second engagement slot 112) when the locking slot 130 is otherwise aligned with a corresponding one of the first engagement slot 110 or the second engagement slot 112.

Accordingly, as can be seen in FIG. 2, when the first engagement slot 110 is aligned with the locking slot 130 and the fastening element 120 is withdrawn completely from the first engagement slot 110 (e.g., by sliding away from the proximal end 44 within the locking slot 130), the handle height adjustment assembly 50 is in the unlocked state and the handle member 40 is free to rotate about the pivot point 70. The handle member 40 can therefore by rotated forward to the folded position 64 (of FIG. 1) as shown in FIG. 3.

Given that the proximal end 44 of the handle members 40 is meant to be pinched between the handle bracket 55 and the knob 72, the proximal end 44 is flat while the remainder of the handle member 40 may be substantially round or tubular in nature for increased strength. The protrusions 100 may therefore be relatively flat and thin pieces of metal that could be bent if not properly engaged by the fastening element 120. Accordingly, if the handle members 40 were rapidly rotated from the folded position 64 toward the first operating position 60 or the second operating position 62 while the fastening element 120 is disposed in a position associated with the locked state instead of being in a position associated with the unlocked state (as shown in FIG. 3), the protrusions 100 may strike the fastening element 120 and become damaged. To inhibit this from occurring, the fastening element 120 may be biased toward the position associated with the unlocked state (as shown in FIG. 3). Although a spring or other biasing member could be provided in or proximate to the locking slot 130 to bias the fastening element 120 away from the proximal end 44 (and toward the position associated with the unlocked state shown in FIG. 3), in some cases, the formation of the locking slot 130 in the handle bracket 55 may be such that the locking slot 130 is angled to allow the force of gravity to draw the fastening element 120 downward and away from the position associated with the locked state (shown in FIGS. 4 and 5). As such, when the knob 72 is loosened, the fastening element 120 may slide under a biasing force (e.g., the force of gravity or a spring) to the position of FIG. 3, and the handle members 40 can be rotated toward or between the first and second operating positions 60 and 62 without the possibility of damaging the protrusions 100.

As can be appreciated, particularly from FIGS. 2-6, the locking slot 130 is formed to extend longitudinally in a direction that is either in-line with or substantially in-line with the direction of extension of the handle members 40 when the handle members 40 are in the locked state in either the first operating position 60 or the second operating position 62. In some cases, only a very small angular difference between the direction of extension of the handle members 40 and the direction of longitudinal extension of the locking slot 130 may therefore exist, and the angle may only slightly be changed when shifting between the first operating position 60 and the second operating position 62. However, a relatively large angle (i.e., an obtuse angle) may be formed between the direction of longitudinal extension of the locking slot 130 and the direction of extension of the handle members 40 when in the folded position 64.

The knob 72 can be tightened or loosened to allow the fastening member 120 to selectively engage respective different portions of the proximal end 44 of the handle members 40. Moreover, the selective engagement is provided responsive to linear movement of the fastening member 120 (e.g., within the locking slot 130) along a direction that is substantially (e.g., within 10 degrees, or even within 5 degrees) of the direction of extension of the handle members 40 when the handle members 40 are in either the first operating position 60 or the second operating position 62, which each offer different handle heights for the handle members 40.

As shown in FIG. 6, the fastening element 120 may define a first axis 203 and the pivot point 70 may define a second axis 205 at a threaded fastener 200. The threaded fastener 200 may engage a receiving orifice 210 that is proximate to the proximal end 44 of the handle member 40. A nut 220 may be tightened onto the threaded fastener 200 to secure the location of the pivot point 70. However, the receiving orifice 210 and the handle member 40 generally may be enabled to rotate or pivot relative to the threaded fastener 200 even when the nut 220 is securely attached thereto. In some cases, a washer 222 may be provided between the nut 220 and the receiving orifice 210 to avoid scratches to the proximal end 44 proximate to the receiving orifice 210. Some embodiments may also employ a spacer 224 that may be provided between the handle bracket 55 and the proximal end 44 of the handle member 40. The spacer 224 may provide for smoother folding of the handle member 40. The spacer 224 may include a protrusion 226 to interface with a second receiving opening 212 of the proximal end 44 of the handle member 40 to provide for proper alignment of the spacer 224 with the proximal end 44 throughout any rotation of the handle member 40.

Meanwhile, the knob 72 is movable along (e.g., rotatable about) the first axis 203 and may, with the fastening element 120, define a knob assembly. The knob assembly may be rotatable about the first axis 203 to shift between the locked state and the unlocked state. Meanwhile, the knob assembly may be movable linearly in a direction perpendicular to the first axis 203 (i.e., in the locking slot 130) to alternately enable and prevent rotation of the handle members 40 about the second axis 205 that extends substantially parallel to the first axis. The handle members 40 may rotate about the second axis 205 to shift between the first and second operating positions 60 and 62 and the folded position 64.

In some embodiments, the fastening element 120 may have a washer 250 provided between the head of the fastening element 120 and the locking slot 130. Meanwhile, the fastening element 120 may be fitted with a nut 252 on an opposite side of the locking slot 130 relative to the washer 250. The nut 252 may be provided to ensure that the fastening element 120 cannot fall out of the locking slot 130 if the knob 72 happens to be removed. To receive the nut 252, a trench 254 may be provided in the handle bracket 55 around the locking slot 130 so that the nut 252 is movable in the trench 254 when the knob 72 is in the unlocked state.

Accordingly, a lawn mower of an example embodiment may include a blade housing configured to house at least one blade, an engine supported at least in part by the blade housing to selectively rotate the at least one blade, a handle assembly comprising handle members (or at least one handle member) for guiding operation of the lawn mower by an operator walking substantially behind the lawn mower, and a handle height adjustment assembly. The handle height adjustment assembly may enable the handle member(s) to be fixed in at least a first operating position or a second operating position each of which defines different handle heights for the handle member(s) responsive to the handle height adjustment assembly being in a locked state, and may also enable the handle member(s) to be rotated between the first operating position, the second operating position, and a folded position responsive to the handle height adjustment assembly being in an unlocked state.

In some embodiments, the features described above may be augmented or modified, or additional features may be added. These augmentations, modifications and additions may be optional and may be provided in any combination. Thus, although some example modifications, augmentations and additions are listed below, it should be appreciated that any of the modifications, augmentations and additions could be implemented individually or in combination with one or more, or even all of the other modifications, augmentations and additions that are listed. As such, for example, the handle height adjustment assembly may be configured to enable the member(s) to be fixed in at least the first operating position or the second operating position each defining different handle heights for the member(s) responsive to the handle height adjustment assembly being in the locked state. The handle height adjustment assembly may also enable the member(s) to be rotated between the first operating position, the second operating position and the folded position responsive to the handle height adjustment assembly being in the unlocked state. In an example embodiment, the handle height adjustment assembly may further include a handle bracket corresponding to the handle member (or to each respective one of the handle members). The handle bracket may be operably coupled to a blade housing of the lawn mower. In such an example, the knob assembly may include a knob releasably engaged with a fastening element to alternately shift the handle height adjustment assembly between the locked and unlocked states based on a position of the fastening element. In some cases, the fastening element may be movable within a locking slot provided in the handle bracket responsive to the handle height adjustment assembly being in the unlocked state. In some embodiments, the locking slot may extend substantially in-line with a direction of extension of the member(s) when the member(s) is/are in either the first operating position or the second operating position. In an example embodiment, the fastening element may be biased toward the unlocked state when the knob is loosened. In some cases, the locking slot may be provided such that the fastening element is at a lower elevation relative to a surface on which the lawn mower operates in the unlocked state and a higher elevation in the locked state. In an example embodiment, any or all of the optional features above may be employed and the member(s) may pivot about a pivot point located at the handle bracket to which each respective one of the member(s) is operably coupled. Alternatively or additionally, a proximal end of each of the handle members may include a plurality of protrusions extending therefrom and the protrusions may define a first engagement slot corresponding to the first operating position and a second engagement slot corresponding to the second engagement position. Alternatively or additionally, a proximal end of each of the handle members comprises a first engagement slot and a second engagement slot and the fastening element may be insertable into the first engagement slot to be locked in the first operating position, and may be insertable into the second engagement slot to be locked in the second operating position.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A lawn mower comprising:
   a blade housing configured to house at least one blade;
   an engine supported at least in part by the blade housing to selectively rotate the at least one blade;
   a handle assembly comprising at least one handle member for guiding operation of the lawn mower by an operator walking substantially behind the lawn mower;
   a handle height adjustment assembly enabling the at least one handle member to be fixed in at least a first operating position or a second operating position each defining different handle heights for the at least one handle member responsive to the handle height adjustment assembly being in a locked state, and enabling the at least one handle member to be rotated between the first operating position, the second operating position, and a folded position responsive to the handle height adjustment assembly being in an unlocked state; and
   a handle bracket corresponding to the at least one handle member, the handle bracket being operably coupled to the blade housing, wherein the handle height adjustment assembly comprises a knob releasably engaged with a fastening element at the handle bracket to alternately shift the handle height adjustment assembly between the locked and unlocked states based on a position of the fastening element,
   wherein the fastening element is movable within a locking slot provided in the handle bracket responsive to the handle height adjustment assembly being in the unlocked state, and
   wherein a proximal end of the at least one handle member comprises a first engagement slot and a second engagement slot, the fastening element being insertable into the first engagement slot to be locked in the first operating position, and being insertable into the second engagement slot to be locked in the second operating position.

2. The lawn mower of claim 1, wherein the locking slot extends substantially in-line with a direction of extension of the at least one handle member when the at least one handle member is in either the first operating position or the second operating position.

3. The lawn mower of claim 1, wherein the fastening element is biased toward the unlocked state when the knob is loosened.

4. The lawn mower of claim 1, wherein the locking slot is provided such that the fastening element is at a lower elevation relative to a surface on which the lawn mower operates in the unlocked state and a higher elevation in the locked state.

5. The lawn mower of claim 1, wherein the at least one handle member pivots about a pivot point located at the handle bracket to which the at least one handle member is operably coupled.

6. The lawn mower of claim 1, wherein a proximal end of the at least one handle member comprises a plurality of protrusions extending therefrom, the protrusions defining the first engagement slot corresponding to the first operating position and the second engagement slot corresponding to the second engagement position.

7. The lawn mower of claim 1, wherein the knob is rotatable about a first axis to shift between the locked state and the unlocked state, the knob being movable linearly in a direction perpendicular to the first axis to alternately enable and prevent rotation of the at least one handle member about a second axis that extends substantially parallel to the first axis, the at least one handle member rotating about the second axis to shift between the first and second operating positions and the folded position.

8. The lawn mower of claim 1, wherein the fastening element is configured to, in the unlocked state, move within the locking slot and relative to both the handle member and the handle bracket.

9. A handle height adjustment assembly for adjusting a height of at least one handle member of a walk-behind outdoor power equipment device, the handle height adjustment assembly comprising:
  a knob assembly movable along a first axis to shift between a locked state and an unlocked state, the knob assembly being movable linearly in a direction perpendicular to the first axis to alternately enable and prevent rotation of the at least one handle member about a second axis that extends substantially parallel to the first axis, the at least one handle member rotating about the second axis to shift between a first operating position, a second operating position, and a folded position in the unlocked state, and
  a handle bracket corresponding to the at least one handle member, the handle bracket being operably coupled to a blade housing of the device, wherein the knob assembly comprises a knob releasably engaged with a fastening element to alternately shift the knob assembly between the locked and unlocked states based on a position of the fastening element,
  wherein the handle height adjustment assembly is configured to enable the at least one handle member to be fixed in at least the first operating position or the second operating position responsive to the knob assembly being in the locked state, each operating position defining different handle heights for the at least one handle member,
  wherein the handle height adjustment assembly is configured to enable the at least one handle member to be rotated between the first operating position, the second operating position, and the folded position responsive to the handle height adjustment assembly being in the unlocked state,
  wherein the fastening element is movable within a locking slot provided in the handle bracket responsive to the handle knob assembly being in the unlocked state, and
  wherein a proximal end of the at least one handle member comprises a first engagement slot and a second engagement slot, the fastening element being insertable into the first engagement slot to be locked in the first operating position, and being insertable into the second engagement slot to be locked in the second operating position.

10. The handle height adjustment assembly of claim 9, wherein the locking slot extends substantially in-line with a direction of extension of the at least one handle member when the at least one handle member is in either the first operating position or the second operating position.

11. The handle height adjustment assembly of claim 9, wherein the fastening element is biased toward the unlocked state when the knob is loosened.

12. The handle height adjustment assembly of claim 9, wherein the locking slot is provided such that the fastening element is at a lower elevation relative to a surface on which the device operates in the unlocked state and a higher elevation in the locked state.

13. The handle height adjustment assembly of claim 9, wherein the at least one handle member pivots about a pivot point located at the handle bracket to which the at least one handle member is operably coupled.

14. The handle height adjustment assembly of claim 9, wherein a proximal end of the at least one handle member comprises a plurality of protrusions extending therefrom, the protrusions defining a first engagement slot corresponding to the first operating position and a second engagement slot corresponding to the second engagement position.

15. The handle height adjustment assembly of claim 9, wherein the fastening element is configured to, in the unlocked state, move within the locking slot and relative to both the handle member and the handle bracket.

* * * * *